United States Patent
Kumakura et al.

(10) Patent No.: US 8,820,654 B2
(45) Date of Patent: Sep. 2, 2014

(54) METHOD OF FORMING THROTTLE PASSAGE AND PIPE WITH THROTTLE PASSAGE

(75) Inventors: Takanao Kumakura, Tokyo (JP); Hirofumi Yamashita, Tokyo (JP)

(73) Assignee: TGK Co., Ltd., Hachioji-shi (JP)

( * ) Notice: Subject to any disclaimer, the term of this patent is extended or adjusted under 35 U.S.C. 154(b) by 728 days.

(21) Appl. No.: 13/088,522

(22) Filed: Apr. 18, 2011

(65) Prior Publication Data

US 2011/0259968 A1    Oct. 27, 2011

(30) Foreign Application Priority Data

Apr. 26, 2010 (JP) .................. 2010-101209
Jan. 14, 2011 (JP) .................. 2011-006252

(51) Int. Cl.
*F25B 41/06* (2006.01)
*B23P 11/00* (2006.01)

(52) U.S. Cl.
CPC ......... *F25B 41/062* (2013.01); *F25B 2341/063* (2013.01); *B23P 11/005* (2013.01)
USPC ..................................... 236/92 B

(58) Field of Classification Search
CPC .................................................. F25B 41/06
USPC .................. 236/92 B, 93 R; 62/222, 511
See application file for complete search history.

(56) References Cited

U.S. PATENT DOCUMENTS

| 3,590,591 | A | * | 7/1971 | Genoud .......................... 62/48.4 |
| 6,889,909 | B2 | | 5/2005 | Kobayashi et al. |
| 2008/0286552 | A1 | | 11/2008 | Kordelin et al. |

FOREIGN PATENT DOCUMENTS

| JP | 41-013129 B | 7/1966 |
| JP | 04-167920 A | 6/1992 |
| JP | 07-043606 U | 9/1995 |
| JP | 7-052538 Y2 | 11/1995 |
| JP | 2004-053182 A | 2/2004 |
| JP | 2004-132498 A | 4/2004 |
| JP | 2006-200844 A | 8/2006 |
| JP | 2009-515072 A | 4/2009 |
| WO | 2007/054608 A1 | 5/2007 |

OTHER PUBLICATIONS

Office Action dated Feb. 4, 2014, issued in corresponding Japanese application No. 2011-006252, w/ English translation (9 pages).

* cited by examiner

*Primary Examiner* — Marc Norman
(74) *Attorney, Agent, or Firm* — Westerman, Hattori, Daniels & Adrian, LLP

(57) ABSTRACT

A throttle passage is formed by providing a step portion by expanding an open end side of a refrigerant passage of the refrigeration cycle, placing a throttle passage member on the step portion, and squashing the throttle passage member using a columnar squashing jig to widen a rim of the outer periphery, thereby causing the throttle passage member to be fixedly engaged to an inner wall of the refrigerant passage. The throttle passage member has a simple shape formed only by machining a circular plate having a hole formed in a center thereof into a truncated conical shape, and therefore can be made at low cost. Throttle passage member is only squashed to be fixedly engaged in the refrigerant passage, and therefore can be easily formed.

7 Claims, 7 Drawing Sheets

METHOD OF FORMING THROTTLE PASSAGE AND PIPE WITH THROTTLE PASSAGE

CROSS-REFERENCE TO RELATED APPLICATIONS

This application is based upon and claims the benefit of priority of the prior Japanese Patent Application No. 2010-101209, filed on Apr. 26, 2010, and the Japanese Patent Application No. 2011-006252, filed on Jan. 14, 2011, the entire contents of which are incorporated herein by reference.

FIELD

The embodiments discussed herein are related to a method of forming a throttle passage, an expansion valve with the throttle passage, and a pipe with the throttle passage.

BACKGROUND

An automotive air conditioner forms a refrigeration cycle by annularly connecting a compressor, a condenser, an expansion valve and an evaporator. The compressor adiabatically compresses gas refrigerant to form high-temperature, high-pressure gas refrigerant, and the condenser cools and condenses the high-temperature, high-pressure gas refrigerant by heat exchange with air outside the vehicle compartment. The condensed liquid refrigerant is adiabatically expanded by the expansion valve to thereby form low-temperature, low-pressure vapor refrigerant, and the vapor refrigerant is evaporated in the evaporator by absorbing heat from air in the vehicle compartment to form gas refrigerant, which is supplied to the compressor. By sequentially performing the above-mentioned operations, the temperature of air in the vehicle compartment is lowered.

The compressor used for the automotive air conditioner is driven by an internal combustion engine whose rotational speed is largely varied depending on the travel state of the vehicle, and hence a variable displacement compressor which is capable of discharging a constant amount of refrigerant irrespective of the travel state is employed. However, depending on the heat exchange conditions in the condenser and the evaporator, pressure changes in the refrigeration cycle become violent, and further, the state variation of the refrigerant also becomes large. For example, in a state where the evaporation capability of the evaporator is low, if high-pressure refrigerant flowing into the expansion valve is in a gas-liquid two-phase state, the refrigerant at an outlet of the expansion valve is also in the gas-liquid two-phase state. At this time, the refrigerant flowing through the valve section of the expansion valve is sometimes gas and sometimes liquid, which causes large pressure changes in the flow of the refrigerant. The pressure changes in the refrigerant cause the liquid level of liquid refrigerant remaining in the refrigeration cycle to rise and fall. Depending on the layout of piping, the liquid refrigerant sometimes blocks off a passage through which the gas refrigerant flows. In this state, if the gas refrigerant forcedly passes through the liquid refrigerant, big bubbles are generated, and when the bubbles burst, large noise is generated.

One known method of reducing such pressure changes in refrigerant as described above is to provide a throttle passage on an inlet side or an outlet side of an expansion valve (see e.g. Japanese Laid-open Patent Publication No. 2006-200844 and Japanese Utility Model Publication No. 07-52538). By providing the throttle passage on the expansion valve, it is possible not only to reduce pressure changes in the refrigeration cycle, but also to reduce noise of refrigerant flowing through the expansion valve by breaking the bubbles of refrigerant flowing therein into much smaller ones. Further, if the throttle passage is provided on the outlet side of the expansion valve, pressure reduction is performed twice, i.e. at the valve section of the expansion valve and at the throttle passage. This reduces the pressure difference at the valve section of the expansion valve, so that the generation of bubbles is suppressed, whereby it is possible to reduce noise of refrigerant flowing through the expansion valve.

However, the conventional throttle passage is formed by press-fitting a cylindrical throttle passage member having a through hole axially formed therethrough into a pipe, or by screwing the throttle passage member into a body of the expansion valve. This brings about problems that the cost of the throttle passage member made with precision is high, and that the fixing of the throttle passage member by press-fitting or screwing causes generation of foreign matter from a sliding surface of the press-fitted portion or the screwed portion, or damage to the press-fitted portion.

SUMMARY

According to an aspect of the invention, there is provided a method of forming a throttle passage in a refrigerant passage through which refrigerant of a refrigeration cycle flows, comprising placing, on a step portion formed by expanding the refrigerant passage, a throttle passage member which is formed by machining a circular plate having a hole formed in a center thereof into a truncated conical shape and has an outer diameter a size of which is between respective inner diameters outward and inward of the step portion, such that a bulging side of the throttle passage member with respect to a plane including an outer periphery thereof faces toward an outer open end of the refrigerant passage, and squashing the throttle passage member from an expanded side of the refrigerant passage while pressing the throttle passage member against the step portion, to deform the throttle passage member such that the outer periphery of the throttle passage member is widened, thereby causing the throttle passage member to be fixedly engaged to an inner wall of the refrigerant passage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are principle views useful in explaining the formation of a throttle passage according to a first embodiment, in which FIG. 1A is a partial cross-sectional view of essential portions of the throttle passage which is about to be formed, and FIG. 1B is a partial cross-sectional view of the essential portions of the throttle passage which has been formed;

FIGS. 2A and 2B are views illustrating a throttle passage member, in which FIG. 2A is a plan view of the throttle passage member, and FIG. 2B is a cross-sectional view of the same;

FIGS. 5A and 5B are views illustrating a pipe with a throttle passage according to a fourth embodiment, in which FIG. 5A is a cross-sectional view of the pipe with the throttle passage, and FIG. 5B is a cross-sectional view of an example of a connection structure of the pipe with the throttle passage;

FIGS. 6A and 6B are views illustrating a variation of the throttle passage member, in which FIG. 6A is a plan view of a throttle passage member, and FIG. 6B is a partial enlarged view of one of protruding portions of the throttle passage member.

DESCRIPTION OF EMBODIMENTS

Figure 1A:
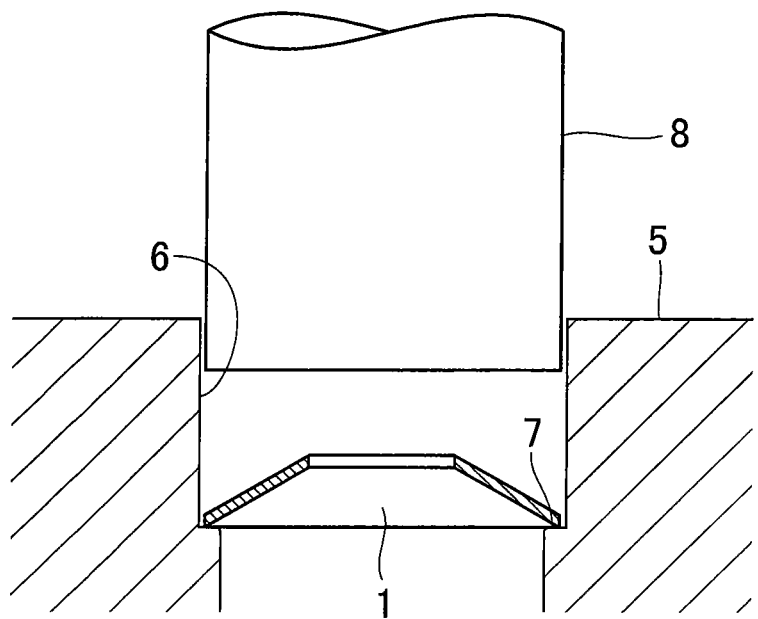

Hereinafter, embodiments of the present invention will be explained below with reference to the accompanying drawings, wherein like reference numerals refer to like elements throughout, by taking examples of cases where a throttle passage is formed in a pipe joint portion of an expansion valve or a refrigerant pipe, as a passage through which refrigerant flows, in a refrigeration cycle of an automotive air conditioner.

Figure 1B:
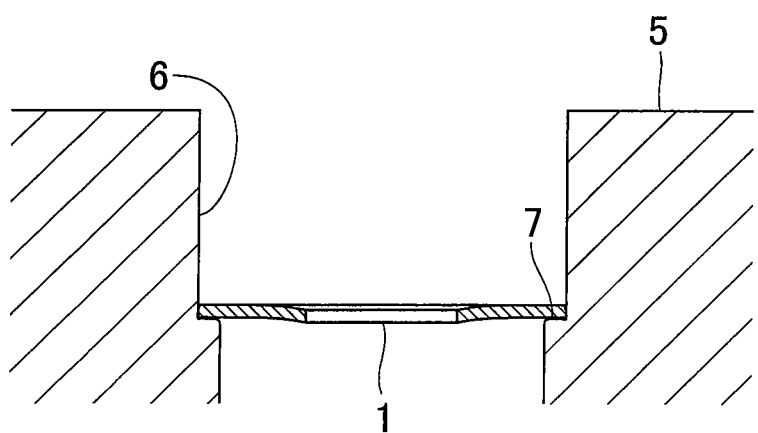
Figure 2A:
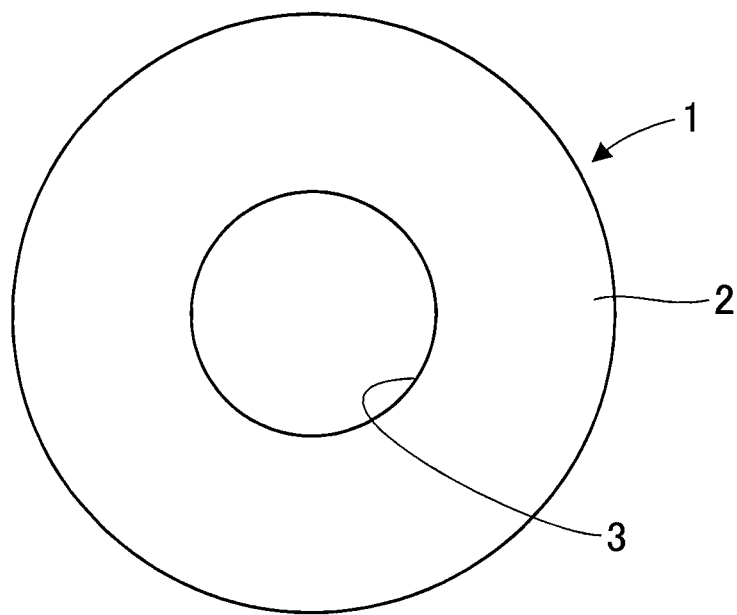
Figure 2B:
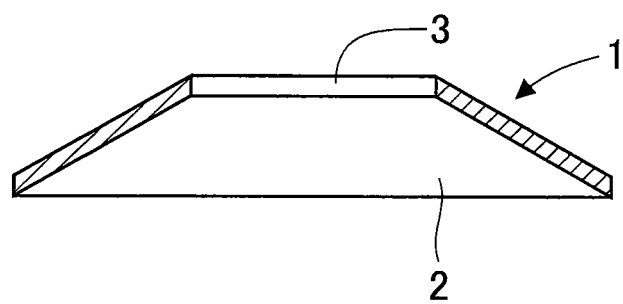

FIGS. 1A and 1B are principle views useful in explaining the formation of a throttle passage according to a first embodiment, in which FIG. 1A is a partial cross-sectional view of essential portions of the throttle passage which is to be formed, and FIG. 1B is a partial cross-sectional view of essential portions of the throttle passage which has been formed. FIGS. 2A and 2B are views illustrating a throttle passage member, in which FIG. 2A is a plan view of the throttle passage member, and FIG. 2B is a cross-sectional view of the same.

As illustrated in FIG. 2, a throttle passage member 1 has a circular hole 3 formed in a central portion of a circular plate 2, and has a truncated conical shape in which a front end portion of a circular cone is truncated. The truncated conical shape is formed by pressing the circular plate 2. As a material of the throttle member 1, a material having no spring properties but malleability-rich plasticity is suitable, and the throttle member 1 can be made of e.g. pure aluminum, or stainless steel which is only subjected to annealing, pickling, and temper rolling, after cold rolling.

A throttle passage can be formed at a desired portion of a refrigerant passage in the refrigeration cycle where a step is formed, by using the throttle passage member 1. That is, as illustrated in FIG. 1A, a refrigerant passage component member 5 is formed with a refrigerant passage 6, and a step portion 7 is formed by expanding a portion of the refrigerant passage 6 closer to an open end thereof. The throttle passage member 1 has an outer diameter the size of which is between an inner diameter of the refrigerant passage 6 and an inner diameter of the expanded portion.

To form the throttle passage, first, the throttle passage member 1 is dropped down from the open end of the refrigerant passage 6 whereby it is placed on the step portion 7. At this time, the throttle passage member 1 is placed such that a bulging side of the throttle passage member 1 with respect to a plane including an outer periphery thereof faces toward the open end of the refrigerant passage 6.

Next, a columnar squashing jig 8 is inserted into the expanded refrigerant passage 6 to squash the throttle passage member 1. In this squashing process, first, the central portion of the throttle passage member 1 is pressed, whereby the rim of the outer periphery is widened outward to be brought into abutment with the inner wall of the expanded portion of the refrigerant passage 6. Thereafter, the inner wall of the refrigerant passage 6 prevents the throttle passage member 1 from being further widened, so that the throttle passage member 1 is deformed such that a portion around the circular hole 3 falls down inward. Finally, as illustrated in FIG. 1B, the throttle passage member 1 is fixedly engaged to and held by the inner wall of the refrigerant passage 6 at the step portion 7, whereby the throttle passage is formed.

Figure 3:
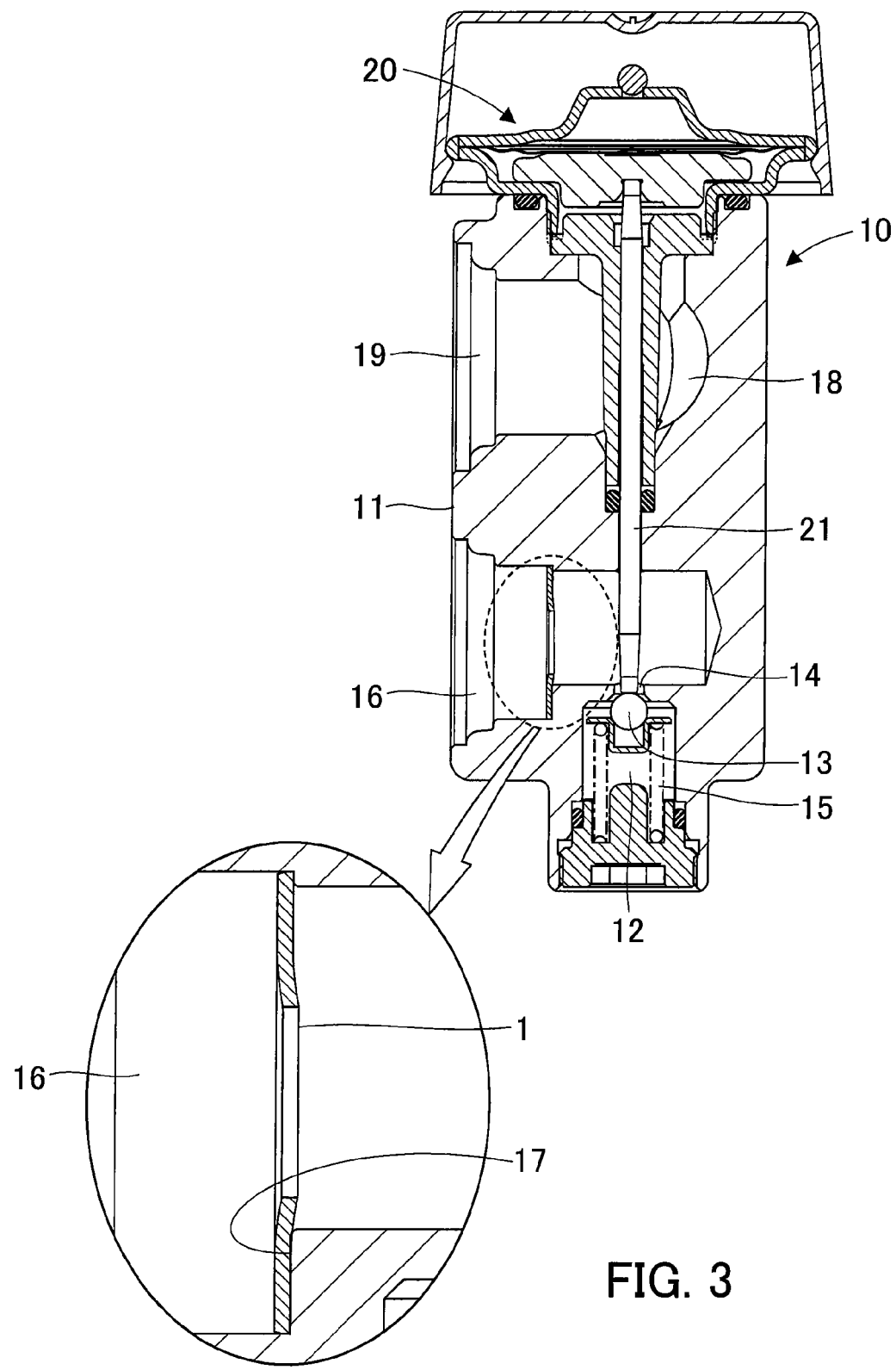
FIG. 3 is a cross-sectional view of an expansion valve with a throttle passage according to a second embodiment.

FIG. 3 is a cross-sectional view of an expansion valve with a throttle passage according to a second embodiment.

An expansion valve 10 according to the second embodiment includes a body 11 having a valve chamber 12 formed in a lower end thereof. The valve chamber 12 has an inlet port, not illustrated, connected thereto for introducing high-pressure refrigerant from a direction perpendicular to the sheet of FIG. 3. A valve element 13 is disposed in the valve chamber 12 in a manner capable of opening and closing a valve hole 14 and is urged by a spring 15 in a direction of closing the valve hole 14. The valve hole 14 is communicated with an outlet port 16 laterally formed in the body 11. The outlet port 16 is formed with a step portion 17 to which the throttle passage member 1 is fixedly engaged by being deformed.

The body 11 has a return passage 18 formed through the upper portion thereof, for allowing the refrigerant discharged from an evaporator to pass therethrough. The return passage 18 is bent at right angles within the body 11. The return passage 18 has an inlet port 19 formed, side by side with the outlet port 16, in the same side wall of the body 11 where the outlet port 16 is formed, and an outlet port, not shown, formed, side by side with the inlet port for introducing high-pressure refrigerant, in the same side wall of the body 11 where the inlet port is formed.

A power element 20 is disposed on the top of the body 11, for detecting temperature and pressure of refrigerant flowing through the return passage 18. The results of detection of temperature and pressure of refrigerant by the power element 20 are transmitted to the valve element 13 via a shaft 21 disposed within the body 11. With this configuration, the lift of the valve element 13 is controlled according to the temperature and pressure of refrigerant discharged from the evaporator.

In the expansion valve 10 configured as above, when the automotive air conditioner is not in operation, the power element 20 does not have a power to actuate the valve element 13, and the valve hole 14 is closed by the valve element 13 urged by the spring 15, so that the expansion valve 10 is in a fully-closed state.

When the automotive air conditioner is started in this state, refrigerant is drawn by the compressor, so that pressure within the return passage 18 connected to an inlet of the compressor drops. The power element 20 senses this and causes the valve element 13 to be lifted. On the other hand, refrigerant compressed by the compressor is condensed by the condenser, and liquid refrigerant obtained by gas/liquid separation in a receiver is supplied to the inlet port of the expansion valve 10 through a high-pressure pipe. The high-temperature, high-pressure liquid refrigerant is expanded while passing through the expansion valve 10, and flows out as low-temperature, low-pressure gas-liquid mixture refrigerant from the outlet port 16. The refrigerant is supplied to the evaporator, and is evaporated in the evaporator by heat exchange with the air in the vehicle compartment. The evaporated refrigerant is returned to the inlet port 19 of the expansion valve 10, and is returned to the inlet of the compressor via the return passage 18. At the time, the power element 20 senses the temperature and pressure of the refrigerant flowing through the return passage 18.

In an initial stage where the automotive air conditioner is started when the temperature of air in the vehicle compartment is high, the temperature of refrigerant returning from the evaporator is high due to heat exchange with the high temperature air in the vehicle compartment, so that the power element 20, which senses the temperature, actuates the valve element 13 to set the expansion valve 10 to a fully-open state.

When the temperature of air in the vehicle compartment becomes lower, causing the temperature of refrigerant returning from the evaporator to become lower, the power element 20 causes the valve element 13 to act in the valve-closing direction to thereby control the flow rate of refrigerant passing through the expansion valve 10. At this time, the expansion valve 10, which senses the temperature of refrigerant at the outlet of the evaporator, controls the flow rate of refrigerant supplied to the evaporator such that the refrigerant maintains a predetermined degree of superheat.

When the expansion valve 10 is in the fully-opened state or controls the flow rate, the refrigerant flowing out from the valve hole 14 is sometimes in the gas-liquid two-phase state, and this is a factor causing pressure changes of refrigerant. However, the throttle passage is formed by fixedly engaging the throttle passage member 1 in the outlet port 16, and a chamber is formed immediately after the valve hole 14, so that this chamber serves as a buffer for reducing pressure changes to prevent the flow of refrigerant from becoming unstable. Further, the gas-liquid two-phase refrigerant flows through the throttle passage, whereby gas refrigerant and liquid refrigerant are mixed, and hence a degree of humidity of the gas-liquid two-phase refrigerant is increased, which makes it possible to keep the liquid level of the remaining liquid refrigerant at a low level. As a result, the liquid refrigerant is less likely to block off the pipe passage, which makes it possible to prevent noise from being generated.

Although the throttle passage member 1 forms the throttle passage by being fixedly engaged in the outlet port 16 at a location downstream of the step portion 17, when the expansion valve 10 is used, a pipe is inserted into the outlet port 16. Therefore, even when the force of fixedly engaging the throttle passage member 1 to the inner wall of the outlet port 16 is small, an end face of the pipe prevents the throttle passage member 1 from coming off from the outlet port 16 during the use of the expansion valve 10.

Figure 4:
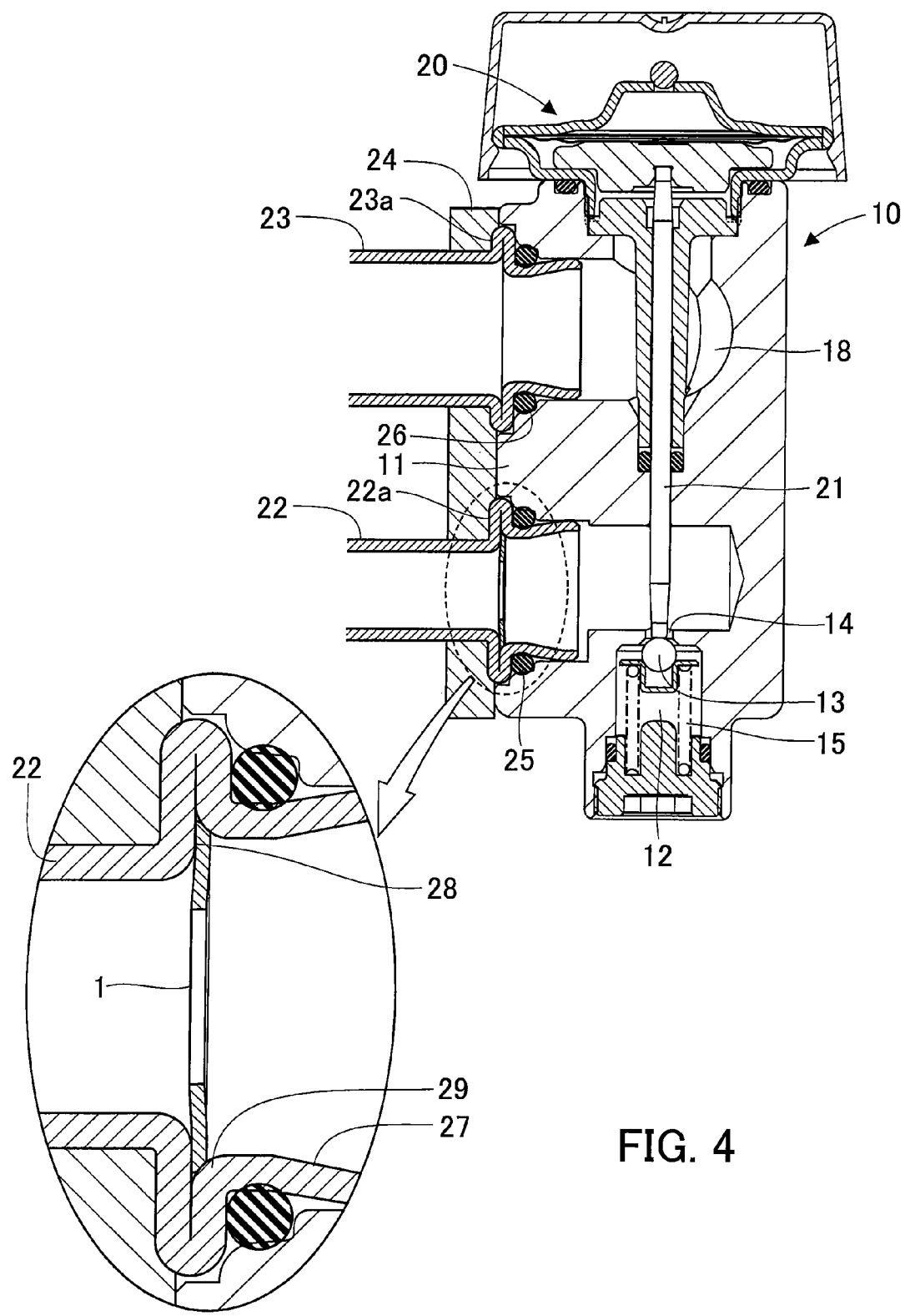
FIG. 4 is a cross-sectional view of a pipe with a throttle passage according to a third embodiment and an expansion valve.

FIG. 4 is a cross-sectional view of a pipe with a throttle passage according to a third embodiment and an expansion valve.

In the third embodiment, a throttle passage is formed in a pipe disposed at a joint portion of the expansion valve 10. Pipes 22 and 23 connected to the outlet port 16 and the inlet port 19 of the expansion valve 10, respectively, are formed with flanges 22a and 23a in the vicinity of respective ends thereof. The pipes 22 and 23 are connected to the expansion valve 10 by pressing the flanges 22a and 23a against the body 11 of the expansion valve 10 using a fixing plate 24 fixed thereto with bolts, and connection portions are sealed by O rings 25 and 26, respectively.

The flange 22a of the pipe 22 is formed by a boundary portion with a large diameter portion 27 formed by expanding a portion closer to an open end of the pipe 22, such that the boundary portion has a shape bulging radially outward. The inside of the flange 22a is in a folded state and is formed with a step portion 28 due to the difference of inner diameters, whereby an annular space is formed between the step portion 28 and a base portion 29 of the large diameter portion 27.

When the throttle passage member 1 is squashed toward the step portion 28 and the outer periphery thereof is widened, the rim of the outer periphery is slid into a gap inside the flange 22a, whereby the throttle passage member 1 is fixedly engaged in the pipe 22. In this case, since the throttle passage member 1 is fixedly engaged in the pipe at a location upstream of the step portion 28, the throttle passage member 1 is prevented from being moved by the force of flow of refrigerant.

Figure 5A:
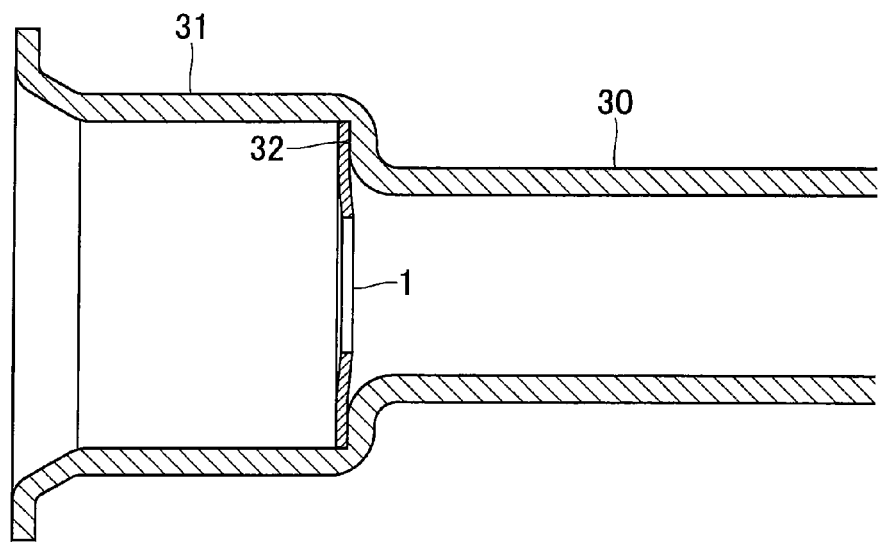
Figure 5B:
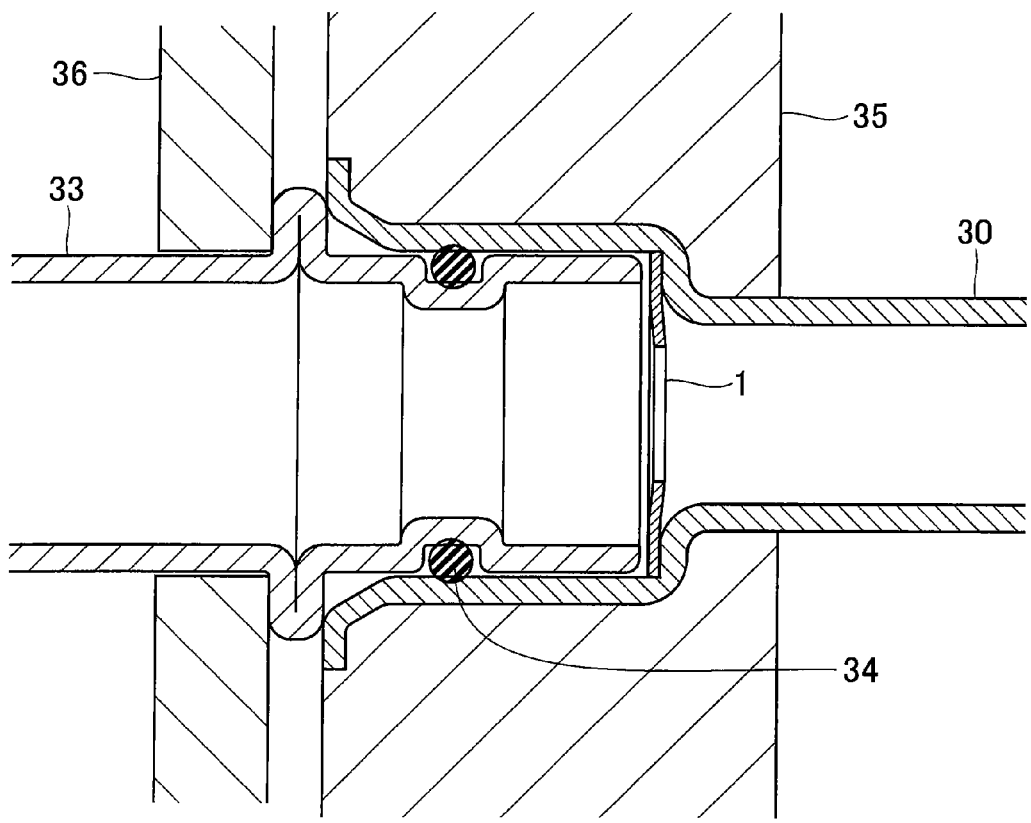

FIGS. 5A and 5B are views illustrating a pipe with a throttle passage according to a fourth embodiment, in which FIG. 5A is a cross-sectional view of the pipe with a throttle passage, and FIG. 5B is a cross-sectional view of an example of a connection structure of the pipe with a throttle passage.

In the fourth embodiment, the throttle passage is formed e.g. in a pipe for connecting the expansion valve 10 and the evaporator. A pipe 30 in which the throttle passage member 1 is disposed has a large diameter portion 31 formed by expanding an portion closer an open end thereof, and a step portion 32 formed at a boundary portion with the large diameter portion 31. The throttle passage member 1 is inserted into the large diameter portion 31 of the pipe 30, and as illustrated in FIG. 5A, is fixedly engaged in the pipe 30 by being squashed toward the step portion 32.

As illustrated in FIG. 5B, the pipe 30 having the throttle passage thus formed therein is connected to another pipe 33. The end of the pipe 33 is inserted into the large diameter portion 31 of the pipe 30, and is sealed by an O ring 34 provided around the pipe 33. The pipes 30 and 33 are connected by fastening fixing plates 35 and 36 respectively provided therefor to each other with e.g. bolts, and are fixed in a sealed state.

Figure 6A:
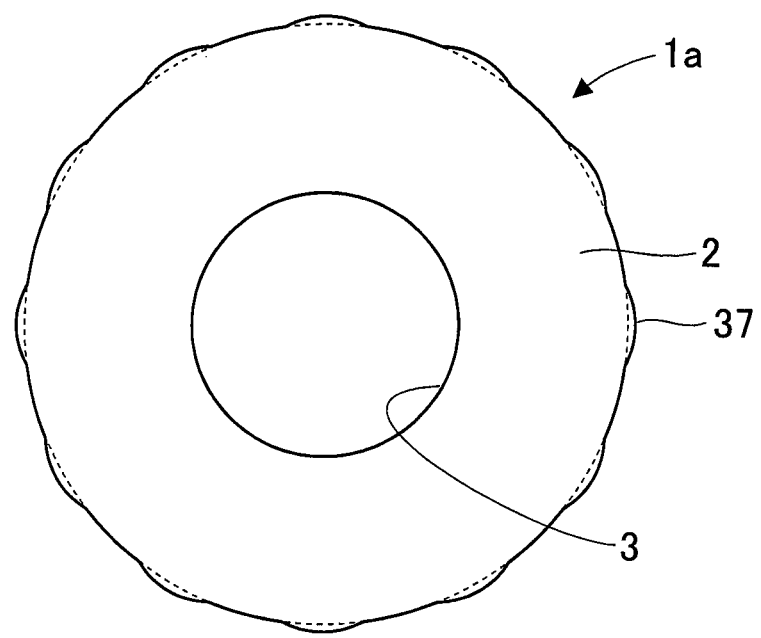
Figure 6B:
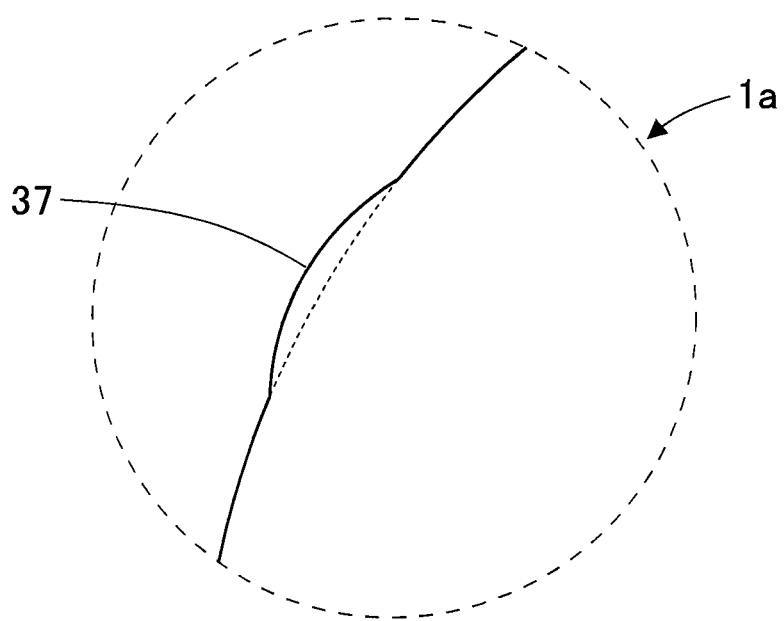

FIGS. 6A and 6B are views illustrating a variation of the throttle passage member, in which FIG. 6A is a plan view of the throttle passage member, and FIG. 6B is a partial enlarged view of one of protruding portions of the throttle passage member.

A throttle passage member 1a is generally formed by machining the circular plate 2 having the circular hole 3 formed in the central portion thereof into a truncated conical shape, similarly to the throttle passage member 1 illustrated in FIG. 2, and in addition, has a plurality of protrusions 37 formed on the rim of the outer periphery in a circumferentially equally-spaced arrangement. The throttle passage member 1a is configured such that an outer diameter thereof including the protrusions 37 has a size between respective inner diameters of the outlet port 16 outward and inward of the step portion 17 when it is mounted in the expansion valve 10 in FIG. 3.

Although the protrusions 37 are each formed into an arc shape in the illustrated example, this is not limitative, but for example, the front end of each protrusion 37 may be pointed in order to make it easier to bite into the inner wall of the refrigerant passage 6.

Since the protrusions 37 are provided on the outer periphery, when the throttle passage member 1a is squashed and fixedly engaged in the refrigerant passage 6, larger stress is applied to the protrusions 37 in a concentrated manner than in a case where the whole periphery of the throttle passage member 1 is caused to bite into the inner wall of the refrigerant passage 6, which makes it easy to deform the protrusions 37 and cause the protrusions 37 to bite into the inner wall. What is more, when the throttle passage member 1a is deformed by squashing, only the protrusions 37 each having a small contact area are squashed to bite into the inner wall of the refrigerant passage 6, and hence it is possible to reduce load for squashing the throttle passage member 1a.

Figure 7:
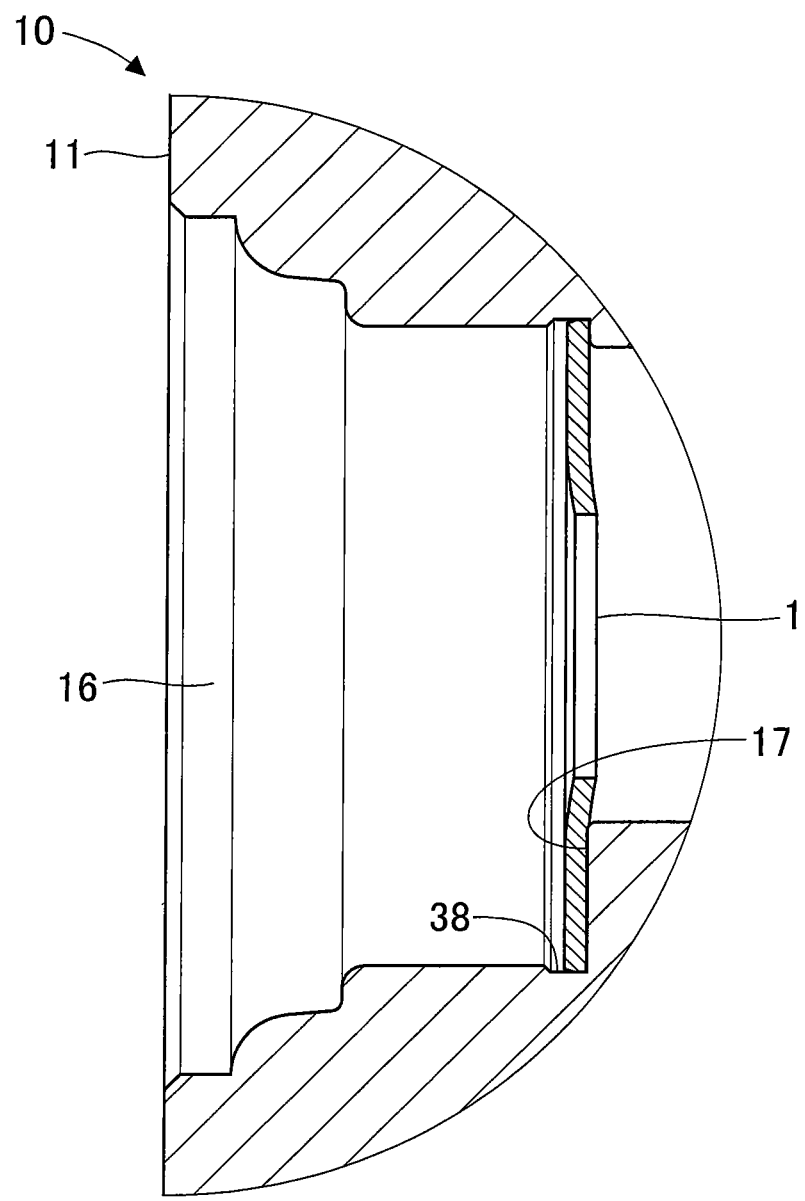
FIG. 7 is a partial enlarged cross-sectional view of essential portions of an expansion valve with a throttle passage according to a fifth embodiment.

FIG. 7 is a partial enlarged cross-sectional view of essential portions of an expansion valve with a throttle passage according to a fifth embodiment. In FIG. 7, component elements identical or equivalent to those appearing in FIG. 3 are designated by identical reference numerals, and detailed description thereof is omitted.

In the expansion valve 10 according to the fifth embodiment, an annular engaging groove 38 is formed in the low-pressure outlet port 16 formed in the body 11, at a location adjacent and outward of the step portion 17 on an open end-side thereof, and the throttle passage member 1 is fixedly engaged in the annular engaging groove 38 by being deformed. Although in the illustrated example, the throttle passage member 1 is fixedly engaged in the engaging groove 38, the throttle passage member 1a illustrated in FIG. 6 may be fixedly engaged therein.

According to this expansion valve 10, even when the expansion valve 10 receives a thermal or physical shock before mounting the pipe to the evaporator, which weakens the force of fixedly engaging throttle passage member 1 in the body 11, it is possible to positively prevent the throttle passage member 1 from coming off the outlet port 16. Further, the throttle passage member 1 may be fixedly engaged in the engaging groove 38 not only by biting, but also by light tension force caused by deformation. This is because in the case of fixedly engaging the throttle passage member 1 by the tension force, the throttle passage member 1 may move within the engaging groove 38 but never moves climbing over the engaging groove 38 toward the open end of the outlet port 16.

According to the method of forming a throttle passage configured as described above, the expansion valve with a throttle passage, and the pipe with a throttle passage, the throttle passage is formed by deforming the throttle passage member having a simple shape, like that of a washer, within the refrigerant passage, and thereby causing the throttle passage member to be fixedly engaged in the refrigerant passage. Therefore, they are advantageous in that it is possible to easily and inexpensively form the throttle passage, compared with a case where a throttle passage is formed by press-fitting or screwing the throttle passage member having a cylindrical shape and having a through hole axially formed therein, into a refrigerant passage.

Further, the throttle passage member is formed such that the outer diameter thereof is smaller than the inner diameter of the refrigerant passage, and hence the inner wall of the refrigerant passage is prevented from being scratched when inserting the throttle passage member into the refrigerant passage. Accordingly, the inner wall of the refrigerant passage into which the throttle passage member is inserted can be a seal surface on which a sealing member, such as an O ring, is disposed.

Further, the throttle passage member is neither press-fitted or screwed into the refrigerant passage, and hence the surface of the inner wall of the refrigerant passage into which the throttle passage member is inserted never scales off to form and deliver foreign material into the refrigeration cycle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. A method of forming a throttle passage in a refrigerant passage through which refrigerant of a refrigeration cycle flows, comprising:
   placing, on a step portion formed by expanding the refrigerant passage, a throttle passage member which is formed by machining a circular plate having a hole formed in a center thereof into a truncated conical shape and has an outer diameter a size of which is between respective inner diameters outward and inward of the step portion, such that a bulging side of the throttle passage member with respect to a plane including an outer periphery thereof faces toward an outer open end of the refrigerant passage; and
   squashing the throttle passage member from an expanded side of the refrigerant passage while pressing the throttle passage member against the step portion, to deform the throttle passage member such that the outer periphery of the throttle passage member is widened, thereby causing the throttle passage member to be fixedly engaged to an inner wall of the refrigerant passage.

2. The method according to claim 1, wherein the throttle passage member is formed of a material which has plasticity and is suppressed from recovering from deformation caused by squashing.

3. A pipe with a throttle passage, which circulates refrigerant in a refrigeration cycle, comprising:
   a large diameter portion that has a step portion formed at a boundary portion by expanding a portion closer to an open end of the pipe;
   a flange formed by protruding said boundary portion radially outward; and
   a throttle passage member having a hole formed in a center thereof, said throttle passage member fixed in a gap formed between said step portion formed inward of said flange and a base portion of said large diameter portion.

4. The pipe with a throttle passage according to claim 3, wherein the throttle passage is formed by squashing said throttle passage member which is formed by machining a circular plate having a hole formed in a center thereof into a truncated conical shape and has an outer diameter a size of which is between an inner diameter of said larger diameter portion and an inner diameter inward of said step portion, while pressing said throttle passage member against said step portion, to deform said throttle passage member such that an outer periphery of said throttle passage member is widened, thereby causing said throttle passage member to be fixedly engaged to an inner wall of said large diameter portion.

5. A method of forming a throttle passage in an expansion valve which subjects refrigerant circulating within a refrigeration cycle to throttle expansion, comprising:
   placing, on a step portion formed, in a low- pressure outlet port from which throttled and expanded refrigerant is delivered, by making an inner diameter outward of the step portion lager than an inner diameter inward of the step portion, a throttle passage member which is formed by machining a circular plate having a hole formed in a center thereof into a truncated conical shape and has an outer diameter a size of which is between respective inner diameters outward and inward of the step potion, such that a bulging side of the throttle passage member with respect to a plane including an outer periphery thereof faces toward an outer open end of the low-pressure outlet port; and squashing the throttle passage member from an expanded side of the low-pressure outlet port while pressing the throttle passage member against the step portion, to deform the throttle passage member such that the outer periphery of the throttle passage member is widened, thereby causing the throttle passage member to be fixedly engaged to an inner wall of the low-pressure outlet port.

6. A method of forming a throttle passage in a refrigerant passage through which refrigerant of a refrigeration cycle flows, comprising:

placing, on a step portion formed by expanding the refrigerant passage, a throttle passage member which is formed by machining a circular plate having a hole formed in a center thereof and having a plurality of protrusions on an outer periphery thereto into a truncated conical shape and has an outer diameter a size of which is between respective inner diameters outward and inward of the step potion, such that a bulging side of the throttle passage member with respect to a plane including an outer periphery thereof faces toward an outer open end of the refrigerant passage; and squashing the throttle passage member from an expanded side of the refrigerant passage while pressing the throttle passage member against the step portion, to deform the throttle passage member such that the outer periphery of the throttle passage member is widened, thereby causing the protrusions of said throttle passage member to be fixedly engaged to an inner wall of the refrigerant passage.

7. A method of forming a throttle passage in a refrigerant passage through which refrigerant of a refrigeration cycle flows, comprising:

placing, on a step portion formed by expanding the refrigerant passage, a throttle passage member which is formed by machining a circular plate having a hole formed in a center thereof into a truncated conical shape and has an outer diameter a size of which is between respective inner diameters outward and inward of the step potion, such that a bulging side of the throttle passage member with respect to a plane including an outer periphery thereof faces toward an outer open end of the refrigerant passage; and squashing the throttle passage member from an expanded side of the refrigerant passage while pressing the throttle passage member against the step portion, to deform the throttle passage member such that the outer periphery of the throttle passage member is widened, thereby causing a rim of the outer periphery of said throttle passage member to be fixedly engaged to an engaging groove which is annular and is formed in the refrigerant passage at a location adjacent and outward of the step portion.

* * * * *